(12) United States Patent
Pacella

(10) Patent No.: US 8,271,466 B2
(45) Date of Patent: Sep. 18, 2012

(54) PURCHASE TRENDING MANAGER

(75) Inventor: Dante J. Pacella, Charles Town, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 420 days.

(21) Appl. No.: 11/961,028

(22) Filed: Dec. 20, 2007

(65) Prior Publication Data

US 2009/0164422 A1    Jun. 25, 2009

(51) Int. Cl.
*G06F 7/00* (2006.01)
(52) U.S. Cl. .................. 707/705; 707/687; 235/380
(58) Field of Classification Search .................. None
See application file for complete search history.

(56) References Cited

U.S. PATENT DOCUMENTS

| | | | |
|---|---|---|---|
| 6,851,611 B1 * | 2/2005 | Shaw-Sinclair | ......... 235/472.01 |
| 7,865,571 B2 | 1/2011 | Ho et al. | |
| 2003/0119485 A1 | 6/2003 | Ogasawara | |
| 2005/0197825 A1 * | 9/2005 | Hagerman et al. | ................ 704/2 |
| 2006/0259372 A1 | 11/2006 | Perrier et al. | |
| 2008/0142599 A1 * | 6/2008 | Benillouche et al. | .... 235/462.41 |

FOREIGN PATENT DOCUMENTS

CN           1257372 A           6/2000

OTHER PUBLICATIONS

Elms Publishing Inc., "My Home Inventory User Guide", copyright 2006 <http://www.my-homeinventory.com/help/mhi1/>.*
Readerware Corporation, "Readerware", Copyright 1999-2005, pp. 1-43, <http://web.archive.org/web/20060101030652/http://www.readerware.com/index.html>.*

* cited by examiner

*Primary Examiner* — Hung Q Pham

(57) ABSTRACT

A device retrieves information associated with purchases from a purchase database, and provides for display of a last purchase option, a sort purchases option, and a lowest cost option based on the purchase information. The device further receives selection of one of the last purchase option, the sort purchases option, or the lowest cost option, and provides for display of last purchase information when the last purchase option is selected. The device also provides for display of sort purchases information when the sort purchases option is selection, and provides for display of lowest cost information when the lowest cost option is selected.

17 Claims, 19 Drawing Sheets

FIG. 7

| Product | Price(s) | Store(s) | Purchase Date(s) |
|---|---|---|---|
| Gas | 0-10 | Various gas stations | Jan. – Dec. 2007 |
| Bread | 11-50 | Various stores | Jan. – Dec. 2007 |
| Bottled Water | 101-500 | Various stores | Jan. – Dec. 2007 |
| Milk | >500 | Various stores | Jan. – Dec. 2007 |
| Soft Drinks | ... | ... | ... |
| Pet Food | ... | ... | ... |
| Beer | ... | ... | ... |
| Diesel Fuel | ... | ... | ... |
| Meat | ... | ... | ... |
| Fruit | ... | ... | ... |
| Other | ... | ... | ... |

FIG. 8

PRODUCT: GAS ◂— 810

| Cost | Store | Purchase Date | Amount | Unit Cost |
|---|---|---|---|---|
| $14.45 | Gas station 1 | Jan. 1, 2007 | 5 gal. | $2.89 |
| $30.00 | Gas station 2 | Feb. 1, 2007 | 10 gal. | $3.00 |
| $36.12 | Gas station 3 | Mar. 1, 2007 | 12 gal. | $3.01 |
| $56.00 | Gas station 4 | Apr. 1, 2007 | 20 gal. | $2.80 |
| $41.85 | Gas station 5 | May 1, 2007 | 15 gal. | $2.79 |
| $32.45 | Gas station 6 | June 1, 2007 | 11 gal. | $2.95 |
| $23.20 | Gas station 7 | July 1, 2007 | 8 gal. | $2.90 |
| $27.70 | Gas station 8 | Aug. 1, 2007 | 10 gal. | $2.77 |
| $28.50 | Gas station 9 | Sep. 1, 2007 | 10 gal. | $2.85 |
| $28.40 | Gas station 10 | Oct. 1, 2007 | 10 gal. | $2.84 |

| SELECTED PURCHASE DETAILS |
|---|
| 11/03/07     $2.89 ←—1310 <br><br> FuelCo ←—1320 <br> 1212 Main Street    }1330 <br> Sometown, Anywhere <br> 12345 <br><br> 5.2 gal. @ $2.89 = $15.07 ←—1340 |

MANUAL ENTRY OF PURCHASE

Select units: ～1410
ounces (oz) ▼～1420
liters ～1430
gallons (gal.) ～1440
pounds (lb.) ～1450
▶

Enter New Purchase Name:
[                    ] ～1460

1400

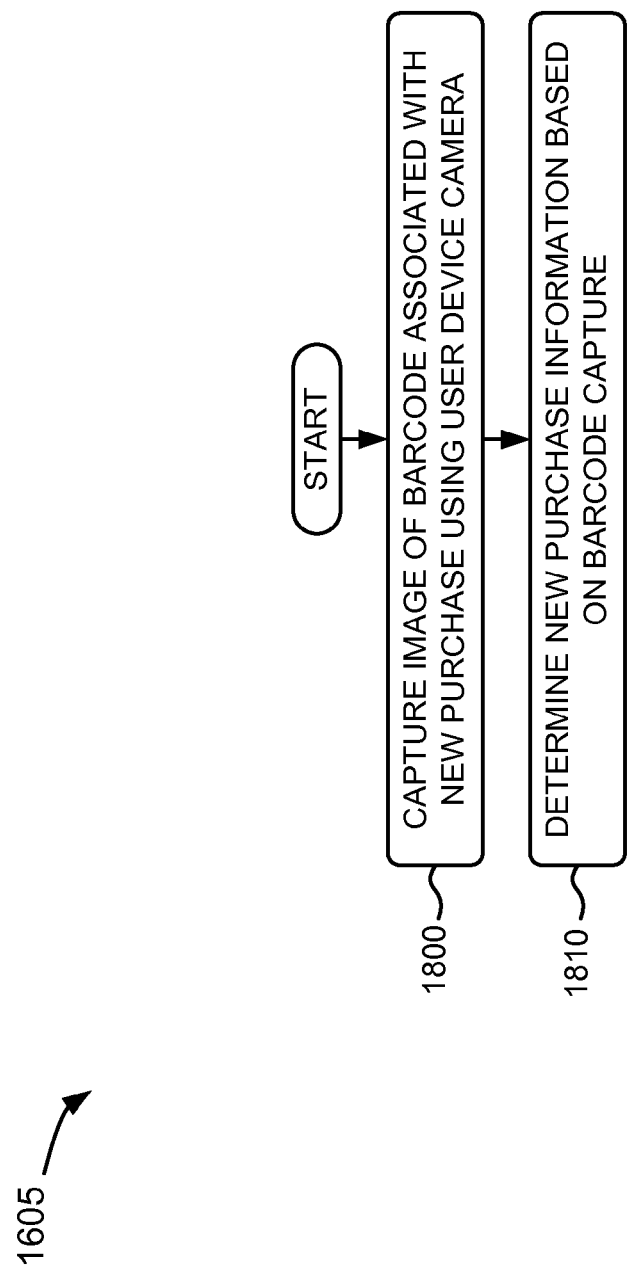

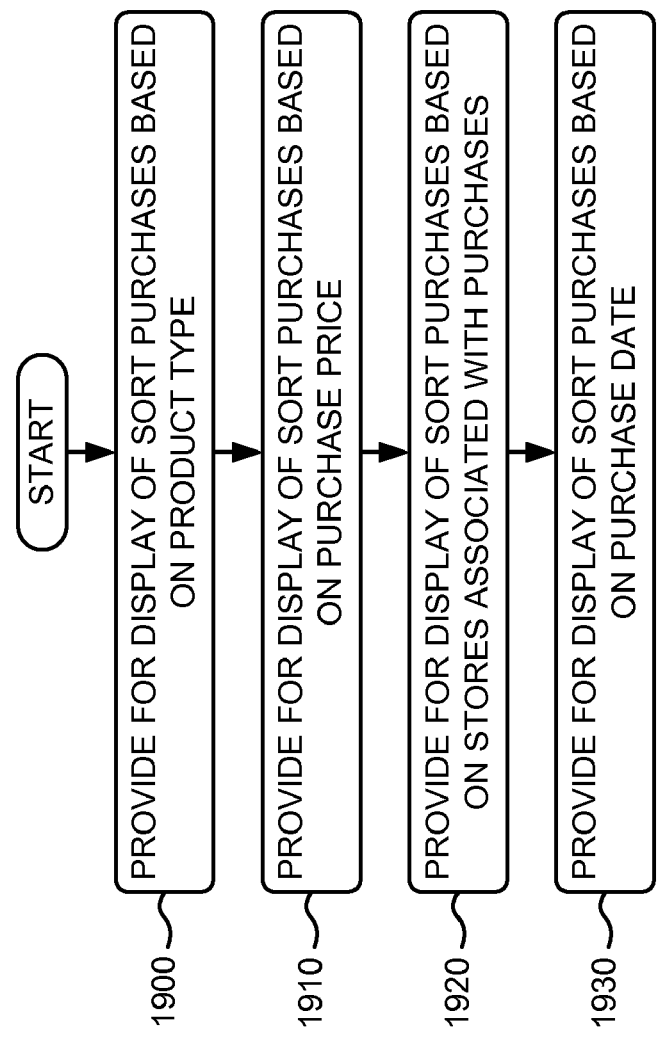

PURCHASE TRENDING MANAGER

BACKGROUND

Magnetic tracking cards are used by shopping clubs, gas stations, grocery stores, book stores, etc. to track shopping behavior of customers who make periodic purchases of elastically-priced goods and/or services. By offering a customer (e.g., using such magnetic tracking cards) a discount on select items or a volume discount on purchases, the customer may receive a perceived value and usage of the magnetic tracking cards may increase.

BRIEF DESCRIPTION OF THE DRAWINGS

FIGS. 7 and 8 depict exemplary portions of purchase databases capable of being provided in the user device and/or the purchase server of the network illustrated in FIG. 1;

FIGS. 9-15 illustrate exemplary user interfaces capable of being displayed by the user device of the network depicted in FIG. 1; and FIGS. 16-19 depict flow charts of an exemplary process according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may input, manage, and track purchases (e.g., purchase trends) using a user device (e.g., a cellular telephone, a personal digital assistant (PDA), other handheld electronic devices, etc.). The purchases may be recorded in a purchase database that may include user-definable information associated with the purchases (e.g., dates of the purchases, stores providing the purchases, costs of the purchases, unit costs of the purchases, types of purchases, etc.). The user or customer may sort the user-definable information using a display of the user device, and may input total units and a cost associated with a purchase to calculate a per-unit price of the purchase (e.g., to be recorded in the purchase database). The customer may use historical purchase information to, for example, comparison shop between sales, stores, and/or franchises on a per visit basis. Customer purchase information may be used to create shopping behavior data profiles that may be marketed to third parties (e.g., stores, service providers, etc.) on an individual, anonymous, and/or aggregate/demographic basis.

As used herein, the terms "customer" and/or "user" may be used interchangeably. Also, the terms "customer" and/or "user" are intended to be broadly interpreted to include a user device or a user of a user device.

The term "purchase," as used herein, is to be broadly interpreted to include a product and/or a service. A "product," as the term is used herein, is to be broadly interpreted to include any thing that may be marketed or sold as a commodity or a good. For example, a product may include gas, bread, coffee, bottled water, milk, soft drinks, pet food, beer, diesel fuel, meat, fruit, etc. A "service," as the term is used herein, is to be broadly interpreted to include any act or variety of work done for others (e.g., for compensation). For example, a service may include a repair service (e.g., for a product), a warranty (e.g., for a product), telecommunication services (e.g., telephone services, Internet services, network services, radio services, television services, video services, etc.), etc.

Figure 1:
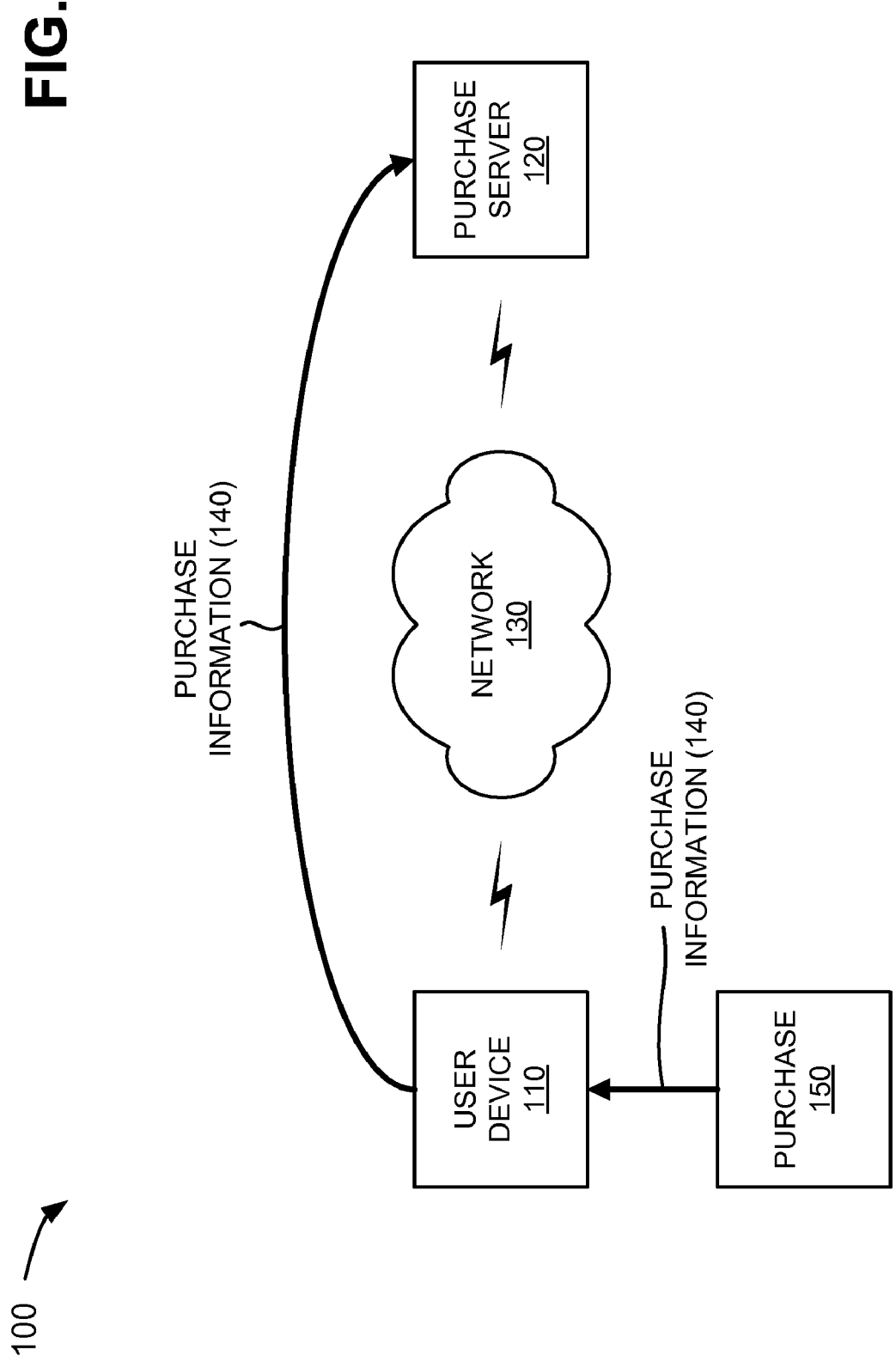
FIG. 1 is an exemplary diagram of a network in which systems and methods described herein may be implemented.

FIG. 1 is an exemplary diagram of a network 100 in which systems and methods described herein may be implemented. As illustrated, network 100 may include a user device 110 and/or a purchase server 120 interconnected by a network 130. User device 110 and/or purchase server 120 may connect to network 130 via wired and/or wireless connections. A single user device, purchase server, and network have been illustrated in FIG. 1 for simplicity. In practice, there may be more or less user devices, purchase servers, and/or networks. Also, in some instances, one or more of user device 110 and/or purchase server 120 may perform one or more functions described as being performed by another one or more of user device 110 and/or purchase server 120.

User device 110 may include any device capable of receiving and/or capturing information associated with a purchase. For example, user device 110 may include a mobile communication device (e.g., a radiotelephone, a personal communications system (PCS) terminal that may combine a cellular radiotelephone with data processing, a facsimile, and data communications capabilities, a PDA that can include a radiotelephone, pager, Internet/intranet access, web browser, organizer, camera, a Doppler receiver, and/or global positioning system (GPS) receiver, a GPS device, a telephone, a cellular telephone, etc.); a laptop; a personal computer; a pager; a camera (e.g., a conventional film camera or a digital camera); a video camera (e.g., a camcorder); a calculator; binoculars with a camera function; a telescope with a camera function; a gaming unit; any other device capable of utilizing a camera; a thread or process running on one of these devices; and/or an object executable by one of these devices. In one exemplary implementation, user device 110 may include a mobile payment service that permits a user to use user device 110 (e.g., a cellular phone) as a credit card (e.g., which may be referred to as "cell phone as credit card"). Further details of user device 110 are provided below in connection with FIGS. 2-4.

As used herein, a "camera" may include a device that may receive, capture, and store images and/or video. For example, a digital camera may be an electronic device that may capture and store images and/or video electronically instead of using photographic film. A digital camera may be multifunctional, with some devices capable of recording sound and/or video, as well as images.

Purchase server 120 may include one or more server entities, or other types of computation or communication devices, that gather, process, search, and/or provide information in a manner described herein. In one implementation, purchase server 120 may include a server (e.g., a computer system or an application) that stores a purchase database that may include user-definable information associated with a purchase (e.g., date of the purchase, store providing the purchase, cost of the purchase, unit cost of the purchase, type of purchase, etc.).

Network 130 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network (e.g., wireless Global System for Mobile Communications (GSM), wireless Code Division Multiple Access (CDMA), etc.), a VoIP network with mobile and/or fixed locations, a wireline network, or a combination of networks.

As further shown in FIG. 1, user device 110 may receive purchase information 140 associated with a purchase 150 (e.g., a purchase by a user of user device 110). For example, in one implementation, user device 110 may receive purchase information 140 by capturing a barcode associated with purchase 150. Further details of capturing a barcode with user device 110 are provided below in connection with FIG. 4. In another implementation, a user of user device 110 may manually input purchase information 140. For example, the user may input purchase information 140, such as a description of purchase 150, a date of purchase 150, a store where purchase 150 was made, a cost of purchase 150, a unit cost of purchase 150, etc. Purchase information 140 may be stored in a purchase database provided in user device 110, and/or may be forwarded by user device 110 (e.g., via network 130) to a purchase database provided in purchase server 120. Further details of the purchase database are provided below in connection with FIGS. 7 and 8.

In one implementation, the information contained in the purchase database may be synchronized across multiple user devices 110. For example, a user or group of users may own multiple user devices 110 (e.g., a husband may own a PDA, a wife may own a cellular phone, etc.), and may want to synchronize the purchase information from the purchase database across the multiple user devices 110. Alternatively, a user may purchase a new or replacement user device 110, and may wish to retain the purchase information. In such scenarios, the multiple user devices 110 may access the information contained in the purchase database from purchase server 120, and/or may store the information locally in the user devices 110. Thus, the multiple user devices 110 (e.g., regardless of their configurations) may have concurrent access to the information contained in the purchase database. Alternatively, and/or additionally, purchase server 120 may provide a query to the multiple user devices 110 to determine if the multiple user devices include the purchase information (e.g., the most recent or updated information contained in the purchase database). If one or more user devices 110 need updated purchase information, purchase server 120 may provide the updated information to user devices 110.

The user of user device 110 may access purchase information (e.g., purchase information 140, historical purchase information, etc.) from the purchase database, and user device 110 may display selectable options associated with the purchase database. For example, user device 110 may display a last purchase option, a sort purchases option, a lowest cost option, etc. If the user selects the last purchase option, user device 110 may display information associated with a last purchase made by the user (e.g., "today you purchased bananas for $3.00"). If the user selects the sort purchases option, user device 110 may display selectable options for sorting the purchase information (e.g., sorting based on product type, purchase price, a store associated with the purchase, a purchase date, etc.). For example, user device 110 may enable the user to sort the purchase information for a product (e.g., gas) based on price, and user device 110 may display a list of gas purchases sorted based on price (e.g., from lowest price to highest price, from highest price to lowest price, etc.). If the user selects the lowest cost option, user device 110 may display purchase information associated with a lowest cost purchase (e.g., "you purchased bubble gum for $0.05 on Nov. 27, 2007").

Figure 2:
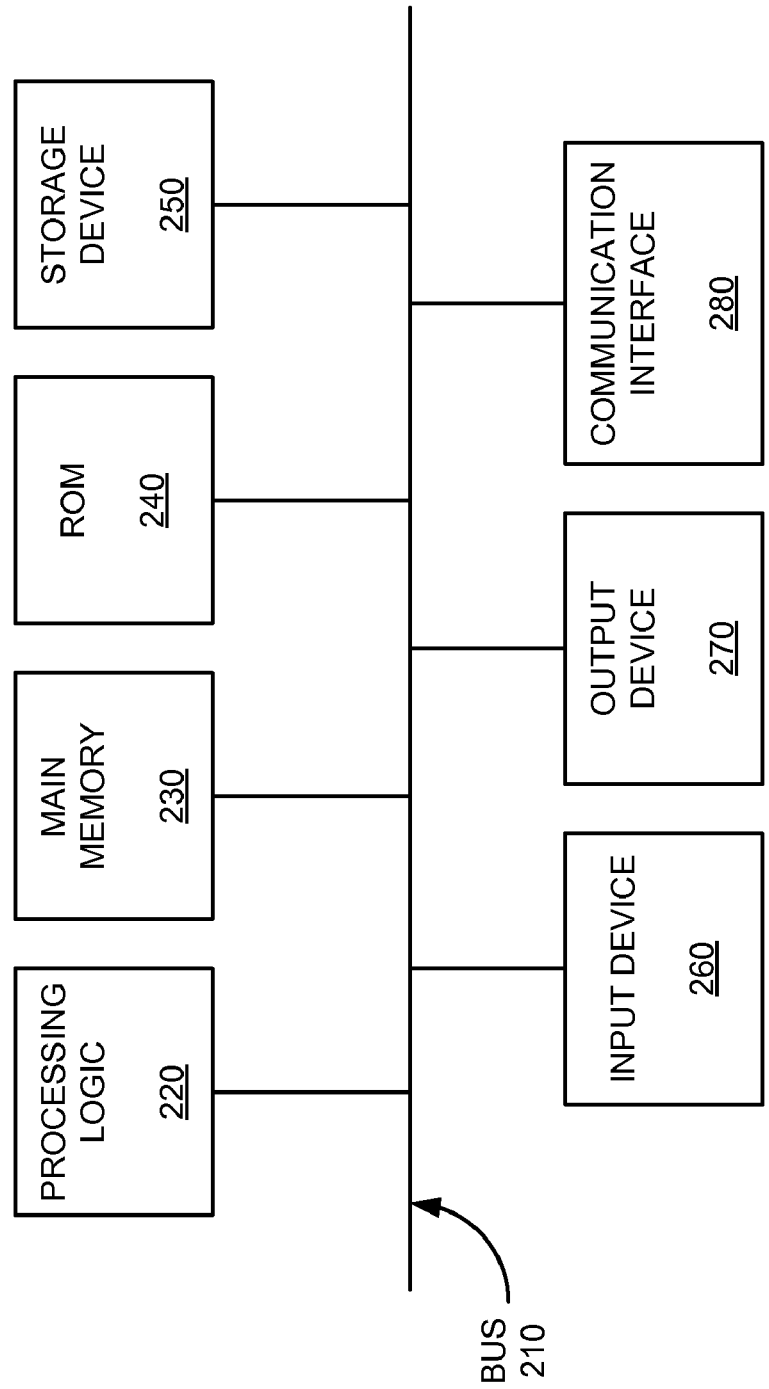
FIG. 2 illustrates exemplary components of a user device and/or a purchase server of the network depicted in FIG. 1.

FIG. 2 is an exemplary diagram of a device 200 that may correspond to user device 110 and/or purchase server 120. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a touch-screen display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 130.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
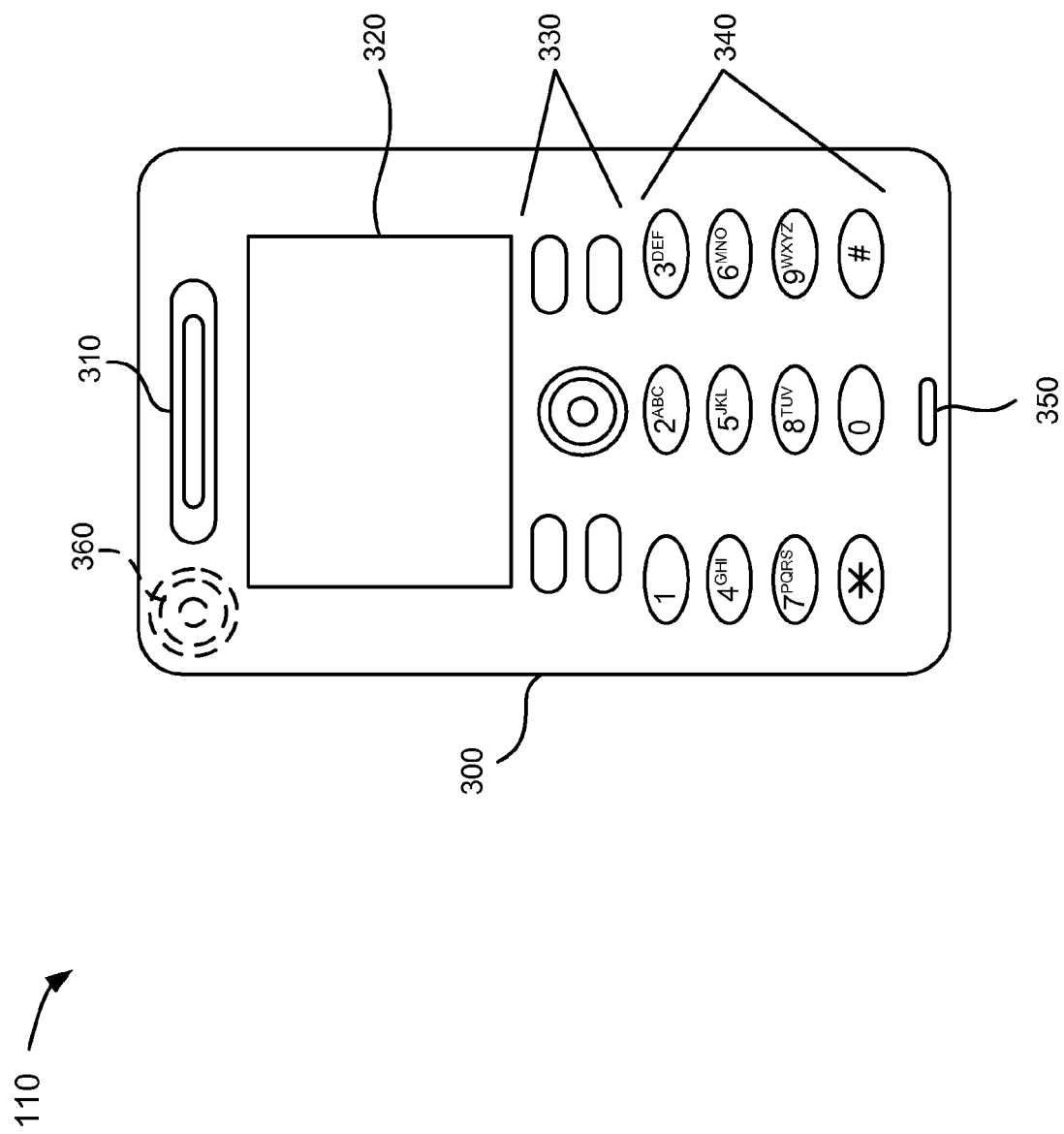
FIG. 3 depicts an exemplary diagram of the user device of the network illustrated in FIG. 1.

FIG. 3 is an exemplary diagram of user device 110. As illustrated, user device 110 may include a housing 300, a speaker 310, a display 320, control buttons 330, a keypad 340, a microphone 350, and/or a camera 360. Housing 300 may protect the components of user device 110 from outside elements. Speaker 310 may provide audible information to a user of user device 110.

Display 320 may provide visual information to the user. For example, display 320 may display text input into user device 110, text, images, video, and/or graphics received from another device, and/or information regarding incoming or outgoing calls or text messages, emails, media, games, phone books, address books, the current time, etc. In some implementations, display 320 may include a touch-sensitive display capable of receiving user input via contact with one or more portions of display 320 (e.g., via user's finger, a stylus, etc.). In one exemplary implementation, display 320 may act as a viewfinder that may aid user device 110 in capturing and/or storing videos and/or images. Control buttons 330 may permit the user to interact with user device 110 to cause user device 110 to perform one or more operations. For example, control buttons 330 may be used to cause user device 110 to transmit information. Keypad 340 may include a standard telephone keypad. Microphone 350 may receive audible information from the user. Camera 360 may be provided on a front or back side of user device 110, and may enable user device 110 to capture and/or store video and/or images (e.g., pictures).

Although FIG. 3 shows exemplary components of user device 110, in other implementations, user device 110 may contain fewer, different, or additional components than depicted in FIG. 3. In still other implementations, one or more components of user device 110 may perform one or more other tasks described as being performed by one or more other components of user device 110.

Figure 4:
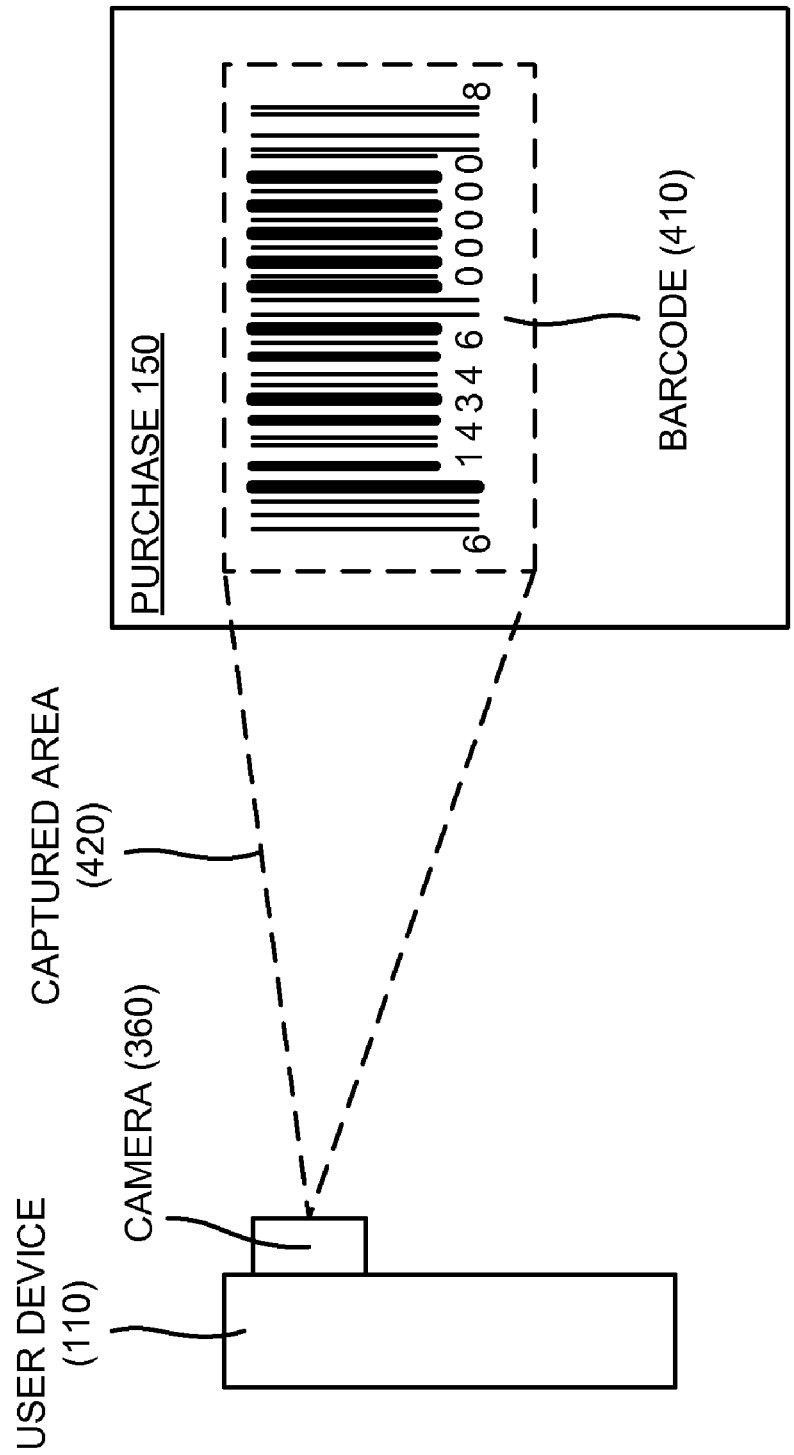
FIG. 4 illustrates a diagram of exemplary interactions between the user device and a purchase of the network depicted in FIG. 1.

FIG. 4 illustrates a diagram of exemplary interactions between user device 110 and purchase 150. As illustrated, purchase 150 (or an item (e.g., packaging, instructions, etc.) associated with purchase 150) may include a barcode 410 that is capable of being captured within a captured area 420 generated by camera 360 of user device 110.

Barcode 410 may include a Universal Product Code (UPC) barcode (e.g. a barcode that may fit twelve digits into a compact space), a European Article Number (EAN) barcode (e.g., a barcode that may be used worldwide for marking retail goods), a "code 39" barcode (e.g., a barcode that may include letters and numbers, and may be used for identification, inventory, and/or tracking purposes in various industries), a "code 128" barcode (e.g., a barcode that may provide a wider selection of characters, may be compact, and may include a dense symbol), an "interleaved 2 of 5" symbology (e.g., a compact symbology which may be used for shipping boxes), a "postnet" barcode (e.g., a symbology that may encode zip codes for processing mail), a "PDF417" barcode (e.g., a two-dimensional barcode that may be a portable data file (PDF)), etc. In one implementation, barcode 410 may encode information associated with purchase 150 (e.g., purchase information 140).

User device 110 may include a barcode reader application that interacts with camera 360 of user device 110 to capture images of barcodes (e.g., barcode 410). The barcode reader application may analyze an image of a barcode and may interpret the barcode image into an actual value (e.g., a UPC value). The barcode reader application may analyze a skew of a barcode to provide an indication of accuracy of the captured image. User device 110 may also use an optical character recognition (OCR) application to check digits provided in a captured barcode image and to verify the accuracy of the interpreted barcode image. The OCR application may act as redundant accuracy check for the barcode reader application. As further shown in FIG. 4, camera 360 may capture an image associated with captured area 420 (e.g., which may include barcode 410), and user device 110 may analyze the captured image with the barcode reader application and/or the OCR application. User device 110 may also display the captured image of barcode 410 (e.g., on display 320).

User device 110 (e.g., using the barcode reader application and/or the OCR application) may extract information associated with barcode 410. In one implementation, user device 110 may extract purchase information 140 from the captured image of barcode 410. For example, user device 110 may extract information, such as a description of purchase 150, a date of purchase 150, a store where purchase 150 was made, a cost of purchase 150, a unit cost of purchase 150, etc.

Although FIG. 4 shows exemplary interactions between user device 110 and purchase 150, in other implementations, fewer, different, or additional interactions may occur between user device 110 and purchase 150.

Figure 5:
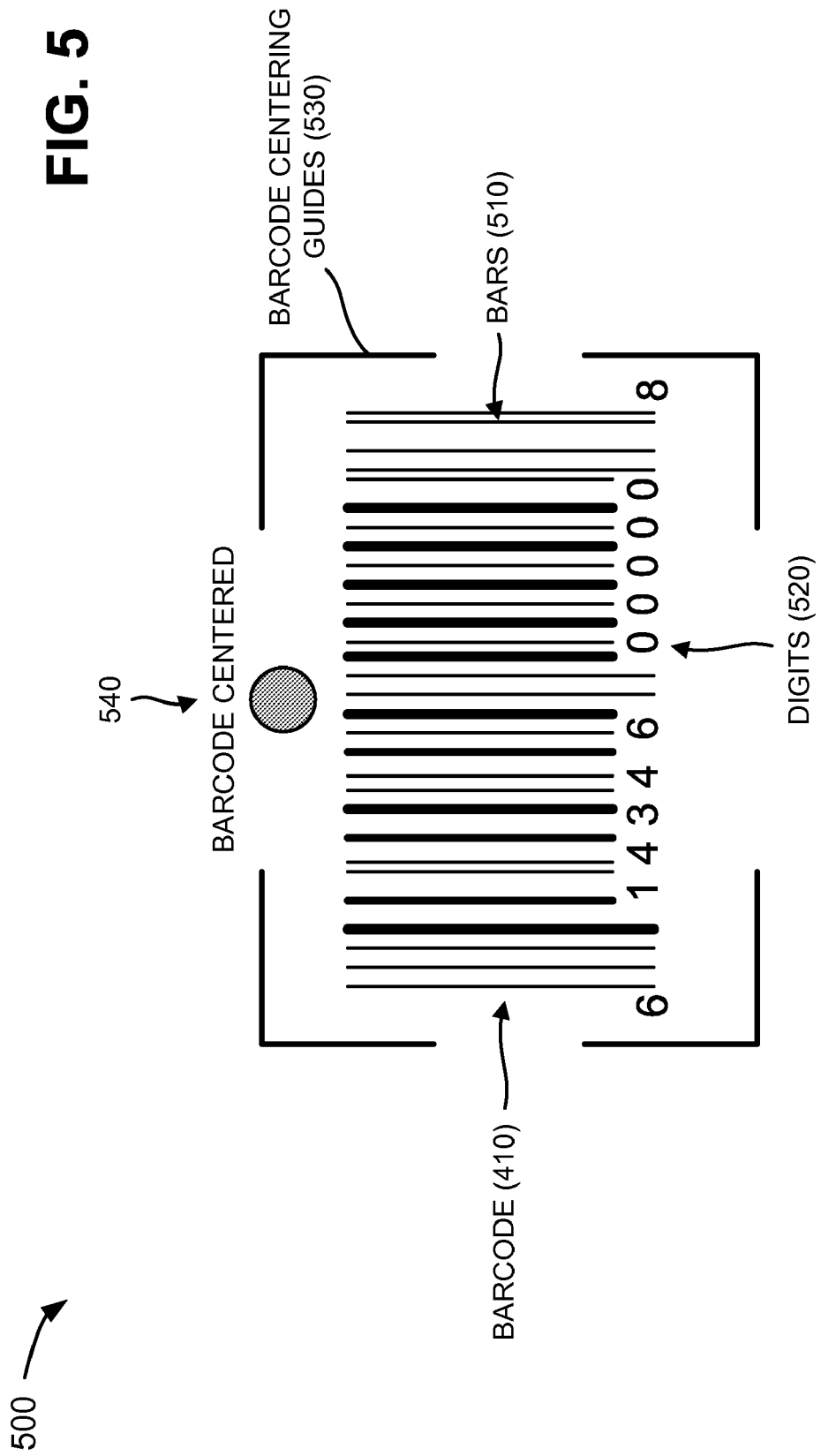
FIG. 5 depicts an exemplary user interface capable of being displayed by the user device of the network illustrated in FIG. 1, and displaying a barcode associated with the purchase shown in FIG. 4.

FIG. 5 depicts an exemplary user interface 500 capable of being displayed by user device 110 (e.g., on display 320). As illustrated, user interface 500 may display the captured image of barcode 410 associated with purchase 150, and may further display bars 510 and digits 520 of barcode 410, barcode centering guides 530, and an indicator 540 that may indicate whether barcode 410 is centered within barcode centering guides.

Bars 510 and spaces between bars 510 may encode a sequence (e.g., a seven-bit sequence in UPC barcodes) that may be interpreted by the barcode reader application provided in user device 110. The barcode reader application provided in user device 110 may analyze bars 510 (and spaces between bars 510) and a skew of the captured image of barcode 410. The barcode reader application may interpret bars 510 (and spaces between bars 510) into information associated with purchase 150 (e.g., purchase information 140). If purchase information 140 is extracted from the captured image of barcode 410, the image may be discarded to avoid a need for storage space for archiving barcode images.

Bars 510 and spaces between bars 510 may provide a visual representation of digits 520 of barcode 410. The OCR application provided in user device 110 may interpret digits 520 into information associated with purchase 150 (e.g., purchase information 140). User device 110 may compare the results obtained by the barcode reader application and the OCR application to ensure that accurate purchase information 140 is retrieved.

Barcode centering guides 530 (e.g., provided by the barcode reader application) may provide alignment or registration marks at four corners of barcode 410 to help a user of user device 110 to center the image of barcode 410 (e.g., using camera 360). Indicator 540 may provide a visual indication that proper alignment of barcode 410 is achieved (e.g., a green light may indicate that barcode 410 is aligned, a red light may indicate that barcode is not aligned, etc.). In other implementations, an audio or an audio/visual indicator may be used for aligning barcode 410 with user device 110.

Although FIG. 5 shows exemplary elements of user interface 500, in other implementations, user interface 500 may contain fewer, different, or additional elements than depicted in FIG. 5.

Figure 6:
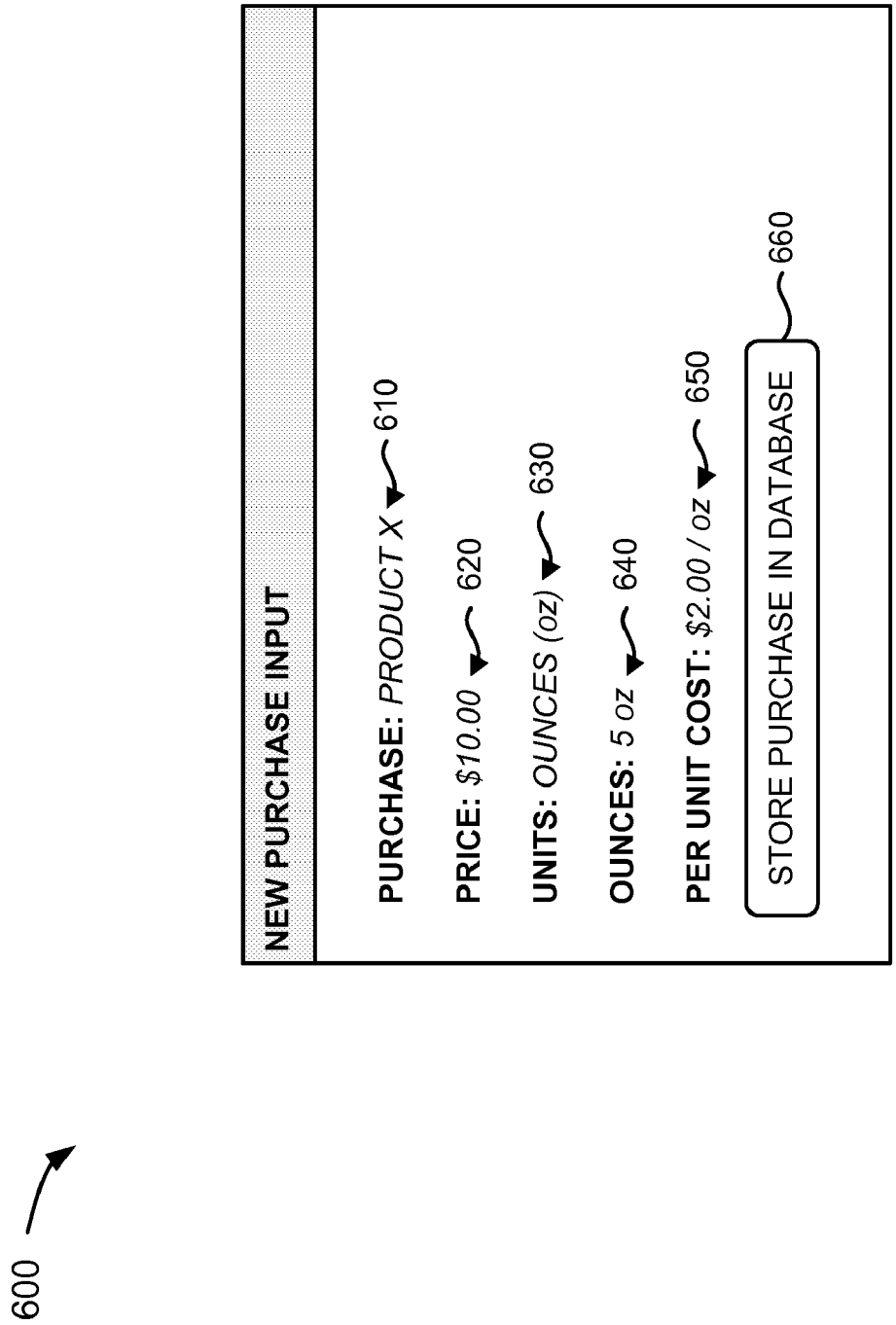
FIG. 6 illustrates an exemplary user interface capable of being displayed by the user device of the network depicted in FIG. 1, and displaying a new purchase input.

FIG. 6 illustrates an exemplary user interface 600 capable of being displayed by user device 110. In one implementation, user interface 600 may be displayed by user device 110 after user device 110 has captured and interpreted information associated with barcode 410 (e.g., purchase information 140). As illustrated, user interface 600 may include a purchase description field 610, a purchase price field 620, a unit description field 630, a unit amount field 640, a per-unit cost field 650, and/or a storage selection mechanism 660.

Purchase description field 610 may include a description of a purchase (e.g., purchase 150). For example, purchase description 610 may include a description or name (e.g., "PRODUCT X") and/or information associated with "PRODUCT X" (e.g., "Product X is not for use by children under 12, and may cause stomach cramps.").

Purchase price field 620 may include a price paid for a purchase (e.g., purchase 150). For example, as shown in FIG. 6, purchase price field 620 may include a price of "$10.00," which may indicate that "PRODUCT X" costs "$10.00."

Unit description field 630 may include a description of units used for a purchase (e.g., purchase 150). For example, as shown in FIG. 6, unit description field 630 may include "OUNCES (oz)" as the units for "PRODUCT X."

Unit amount field 640 may include a description and an amount of the units used for purchase (e.g., purchase 150). For example, as shown in FIG. 6, unit amount field 640 may indicate that "PRODUCT X" contains "5 oz."

Per-unit cost field 650 may include per-unit cost information associated with a purchase (e.g., purchase 150). For example, as shown in FIG. 6, per-unit cost field 650 may indicate that "PRODUCT X" costs "$2.00" per ounce.

Storage selection mechanism 660 may include a mechanism (e.g., a button, an icon, a link, etc.) that, if selected (e.g., with a selection mechanism), may enable user device 110 to store information provided by user interface 600 in a purchase database (e.g., provided in user device 110 and/or purchase server 120).

Although FIG. 6 shows exemplary elements of user interface 600, in other implementations, user interface 600 may contain fewer, different, or additional elements than depicted in FIG. 6.

FIG. 7 depicts a portion 700 of an exemplary purchase database capable of being provided in and/or managed by user device 110 and/or purchase server 120. In one implementation, the information provided in database portion 700 may be manually provided by a user of user device 110. In another implementation, the information provided in database portion 700 may be automatically provided by a purchase 150 (e.g., via barcode 410). In one exemplary implementation, the purchase database may include a relational and/or a structured query language (SQL) based database.

As illustrated, database portion 700 may include a variety of types of purchase information. For example, database portion 700 may include a product field 710, a price(s) field 720, a store(s) field 730, a purchase date(s) field 740, and/or a variety of entries 750 associated with fields 710-740.

Product field 710 may include names of any products purchased by a user of user device 110. For example, product field 710 may include entries 750 for gas, bread, bottled water, milk, soft drinks, pet food, beer, diesel fuel, meat, fruit, other products, etc.

Price(s) field 720 may include a number of prices associated with a product provided in product field 710. For example, price(s) field 720 may indicate that there are between "0-10" prices available for the gas provided in product field 710, that there are between "11-50" prices available for the bread provided in product field 710, that there are between "101-500" prices available for the bottled water provided in product field 710, and that there are more than "500" prices available for the milk provided in product field 710.

Store(s) field 730 may include information associated with stores where the products provided in product field 710 were purchased. For example, store(s) field 730 may indicate that the gas provided in product field 710 was purchased at various gas stations, and that the bread, bottled water, and milk provided in product field 710 was purchased at various stores.

Purchase date(s) field 740 may include information associated with dates when the products provided in product field 710 were purchased. For example, purchase date(s) field 740 may indicate that the gas, bread, bottled water, and milk provided in product field 710 was purchased between January 2007 and December 2007.

Although FIG. 7 shows exemplary information that may be provided in database portion 700, in other implementations, database portion 700 may contain fewer, different, or additional information than depicted in FIG. 7.

FIG. 8 depicts a portion 800 of an exemplary purchase database capable of being provided in and/or managed by user device 110 and/or purchase server 120. In one implementation, the information provided in database portion 800 may be manually provided by a user of user device 110. In another implementation, the information provided in database portion 800 may be automatically provided by a purchase 150 (e.g., via barcode 410, a product code associated with purchase 150, a stock keeping unit (SKU) associated with product 150, and/or other product identification mechanisms). In one exemplary implementation, the purchase database may include a relational and/or a structured query language (SQL) based database.

As illustrated, database portion 800 may include a variety of purchase information for a particular product 810 (e.g., gas). For example, database portion 800 may include a cost field 820, a store field 830, a purchase date field 840, an amount field 850, a unit cost field 860, and/or a variety of entries 870 associated with fields 820-860.

Cost field 820 may include total costs of product 810 for particular purchases. For example, cost field 820 may indicate that product 810 cost "$14.45" for a first entry 870, "$30.00" for a second entry 870, "36.12" for a third entry 870, etc.

Store field 830 may include information (e.g., name, address, telephone number, etc.) associated with stores where product 810 was purchased. For example, store field 830 may indicate that product 810 was purchased at "Gas station 1" for the first entry 870, at "Gas station 2" for the second entry 870, at "Gas station 3" for the third entry 870, etc.

Purchase date field 840 may include information associated with dates when product 810 was purchased. For example, purchase date field 840 may indicate that product 810 was purchased on Jan. 1, 2007 for the first entry 870, on Feb. 1, 2007 for the second entry 870, on Mar. 1, 2007 for the third entry 870, etc.

Amount field 850 may include amounts of product 810 purchased on each purchase date (e.g., provided in purchase date field 840). For example, amount field 850 may indicate that "5 gallons" of product 810 was purchased for the first entry 870, "10 gallons" of product 810 was purchased for the second entry 870, "12 gallons" of product 810 was purchased for third entry 870, etc.

Unit cost field 860 may include per-unit cost information for product 810 (e.g., cost field 820 divided by amount field 850). For example, unit cost field 860 may indicate that product 810 costs "$2.89 per gallon" for first entry 870, "$3.00 per gallon" for second entry 870, "$3.01 per gallon" for third entry, etc.

Although FIG. 8 shows exemplary information that may be provided in database portion 800, in other implementations, database portion 800 may contain fewer, different, or additional information than depicted in FIG. 8. The exemplary information depicted in FIG. 8 may permit user of user device 110 to determine, for example, what stores offer the cheapest products (e.g., "Gas station 8" may offer the cheapest gas prices), product usage patterns (e.g., am I using too much gasoline? Why am I filling up with gas so frequently?), where certain products are purchased more often, etc.

FIGS. 9-15 illustrate exemplary user interfaces capable of being displayed by user device 110. The user interfaces depicted in FIGS. 9-15 and user interfaces 500 and 600, described above in connection with FIGS. 5 and 6 (collectively referred to as "the user interfaces"), may include a graphical user interface (GUI) or a non-graphical user interface, such as a text-based interface. The user interfaces may provide information to users via a customized interface (e.g., a proprietary interface) and/or other types of interfaces (e.g., a browser-based interface). The user interfaces may receive user inputs via one or more input devices (e.g., input device 260), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices (e.g., output device 270).

Figure 9:
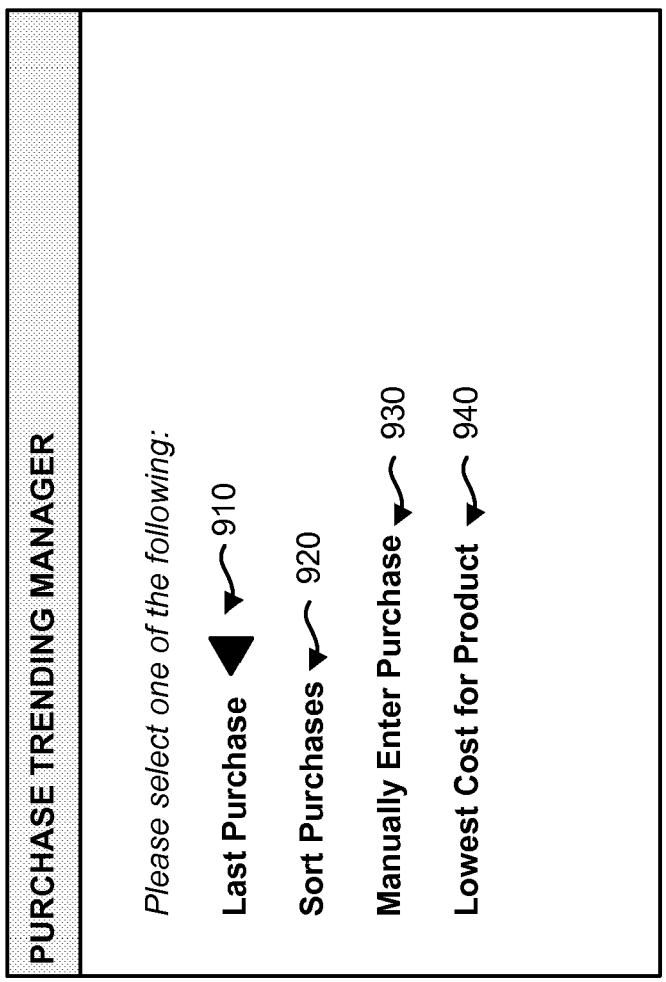

FIG. 9 illustrates an exemplary user interface 900 that displays a main screen for the purchase trending manager described herein. As illustrated, user interface 900 may include a last purchase option 910, a sort purchases option 920, a manually enter purchase option 930, and/or a lowest cost for product option 940. Options 910-940 may be selected by a user of user device 110 (e.g., via display 320 (e.g., a touch-screen display), control buttons 330, and/or keypad 340).

If the user selects last purchase option 910, user device 110 may display information associated with a last purchase recorded by user device 110. For example, if the last recorded purchase by the user was $20.00 worth of gasoline at Gas station 1 on Nov. 30, 2007, user device 110 may retrieve (e.g., from the purchase database) and display this information to the user if last purchase option 910 is selected.

Figure 10:
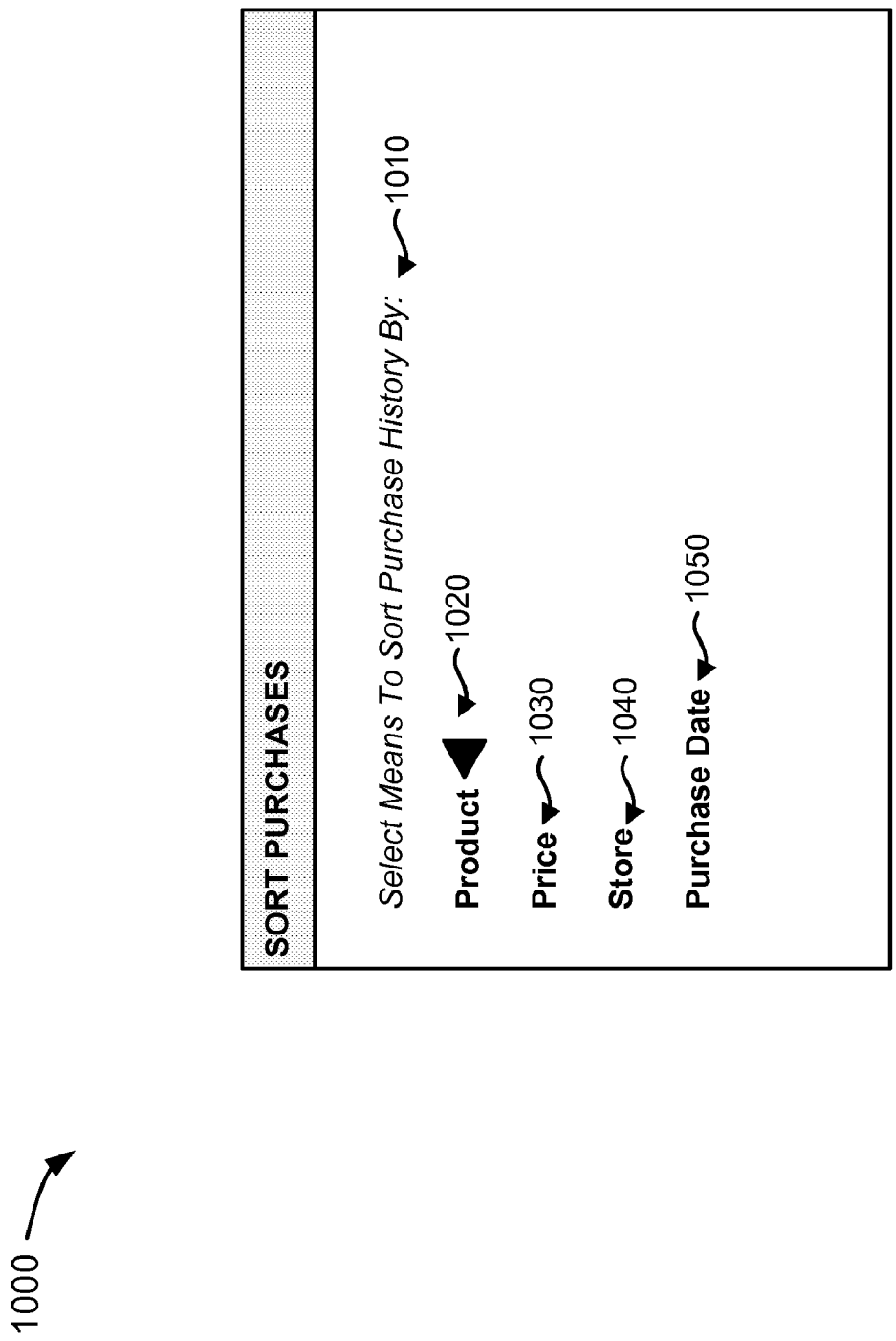

If the user selects sort purchases option 920, user device 110 may display an exemplary user interface 1000, as depicted in FIG. 10. As illustrated in FIG. 10, user interface 1000 may include an instruction section 1010, a product selection 1020, a price selection 1030, a store selection 1040, and/or a purchase date selection 1050. Instruction section 1010 may instruct the user to select a means (e.g., selections 1020-1050) by which to sort purchases (e.g., "Select Means To Sort Purchase History By"). Selections 1020-1050 may be selected by a user of user device 110 (e.g., via display 320 (e.g., a touch-screen display), control buttons 330, and/or keypad 340), and may permit the user to sort purchases based on product (e.g., product selection 1020), price (e.g., price selection 1030), store (e.g., store selection 1040), and/or purchase date (e.g., purchase date selection 1050).

Figure 11:
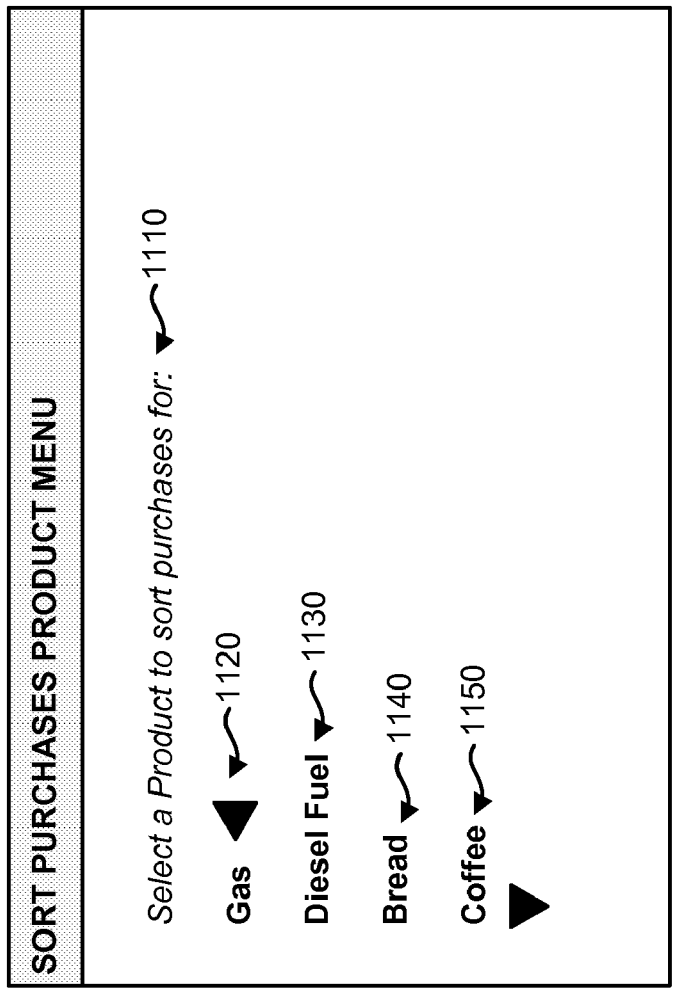

If the user selects product selection 1020, an exemplary user interface 1100, as depicted in FIG. 11, may be displayed by user device 110. As illustrated in FIG. 11, user interface 1100 may include an instruction section 1110 and various product selections 1120-1150. Instruction section 1110 may instruct the user to select a product by which to sort purchases (e.g., "Select a Product to sort purchases for"). Product selections 1120-1150 may include any of the products (e.g., gas, diesel fuel, bread, coffee, etc.) provided in the purchase database (e.g., provided in database portion 900 depicted in FIG. 9), and may be selected by a user of user device 110 (e.g., via display 320, control buttons 330, and/or keypad 340).

Figure 12:
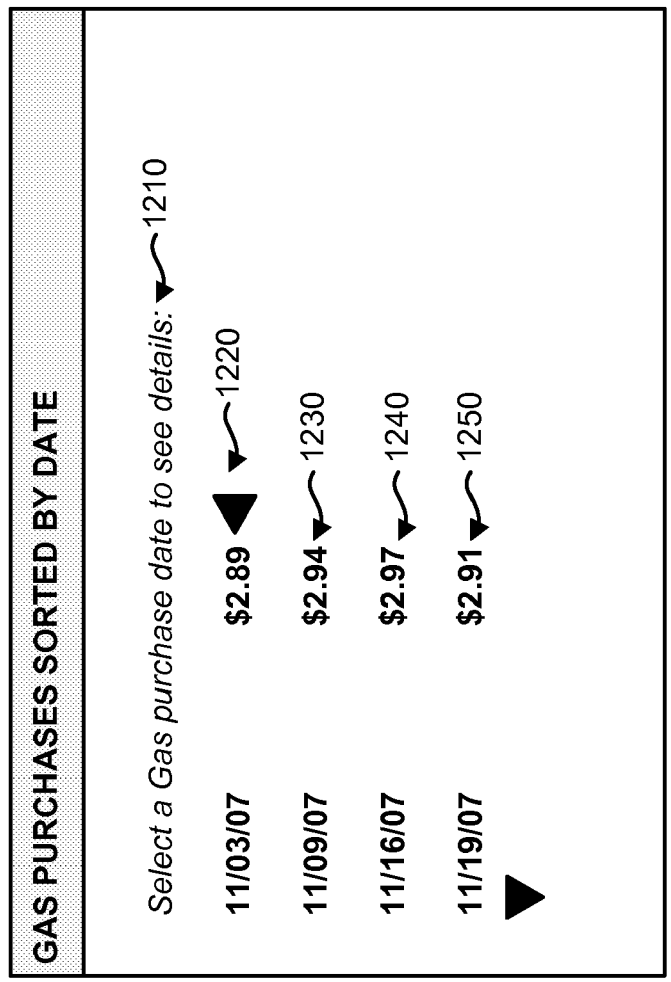

If the user selects product selection 1120 (e.g., gas), an exemplary user interface 1200, as depicted in FIG. 12, may be displayed by user device 110. As illustrated in FIG. 12, user interface 1200 may provide gas purchases sorted by date, and may include an instruction section 1210 and various date selections 1220-1250. In other implementations, the gas purchases displayed by user interface 1200 may be sorted based on a variety of other parameters (e.g., based on per-unit cost).

Instruction section 1210 may instruct the user to select a product purchase date in order to see details of the purchase (e.g., "Select a Gas purchase date to see details"). Date selections 1220-1250 may include various purchase dates and/or other purchase information (e.g., per-unit cost) associated with product selection 1120 (e.g., gas).

If the user selects one of date selections 1220-1250 (e.g., date selection 1220), an exemplary user interface 1300, as depicted in FIG. 13, may be displayed by user device 110. As illustrated in FIG. 13, user interface 1300 may include details associated with a selected purchase, such as date and/or per-unit information 1310 (e.g., "Nov. 3, 2007" and "$2.89 per gallon"), store name information 1320 (e.g., "FuelCo"), store address information 1330 (e.g., "1212 Main Street, Sometown, Anywhere 12345"), total purchase cost information 1340 (e.g., "5.2 gallons @ $2.89 per gallon=$15.07").

Returning to FIG. 9, if the user selects manually enter purchase option 930, user device 110 may display an exemplary user interface 1400, as depicted in FIG. 14. As illustrated in FIG. 14, user interface 1400 may include an instruction section 1410, unit selections 1420-1450, and a new purchase input mechanism 1460. Instruction section 1410 may instruct the user to select units associated with a new purchase (e.g., "Select units"). Unit selections 1420-1450 may include a variety of units of measure associated with purchases (e.g., ounces, liters, gallons, pounds, etc.), and may be selected by a user of user device 110 (e.g., via display 320, control buttons 330, and/or keypad 340). New purchase input mechanism 1460 may include an input field (e.g., for typing descriptive information associated with a new purchase), a drop-down menu (e.g., for selecting descriptive purchase information from a list of purchase information), and/or other types of input mechanisms. New purchase information provided via user interface 1400 may be provided to the purchase database (e.g., databases 700 and/or 800) that may be stored in user device 110 and/or purchase server 120.

Figure 15:
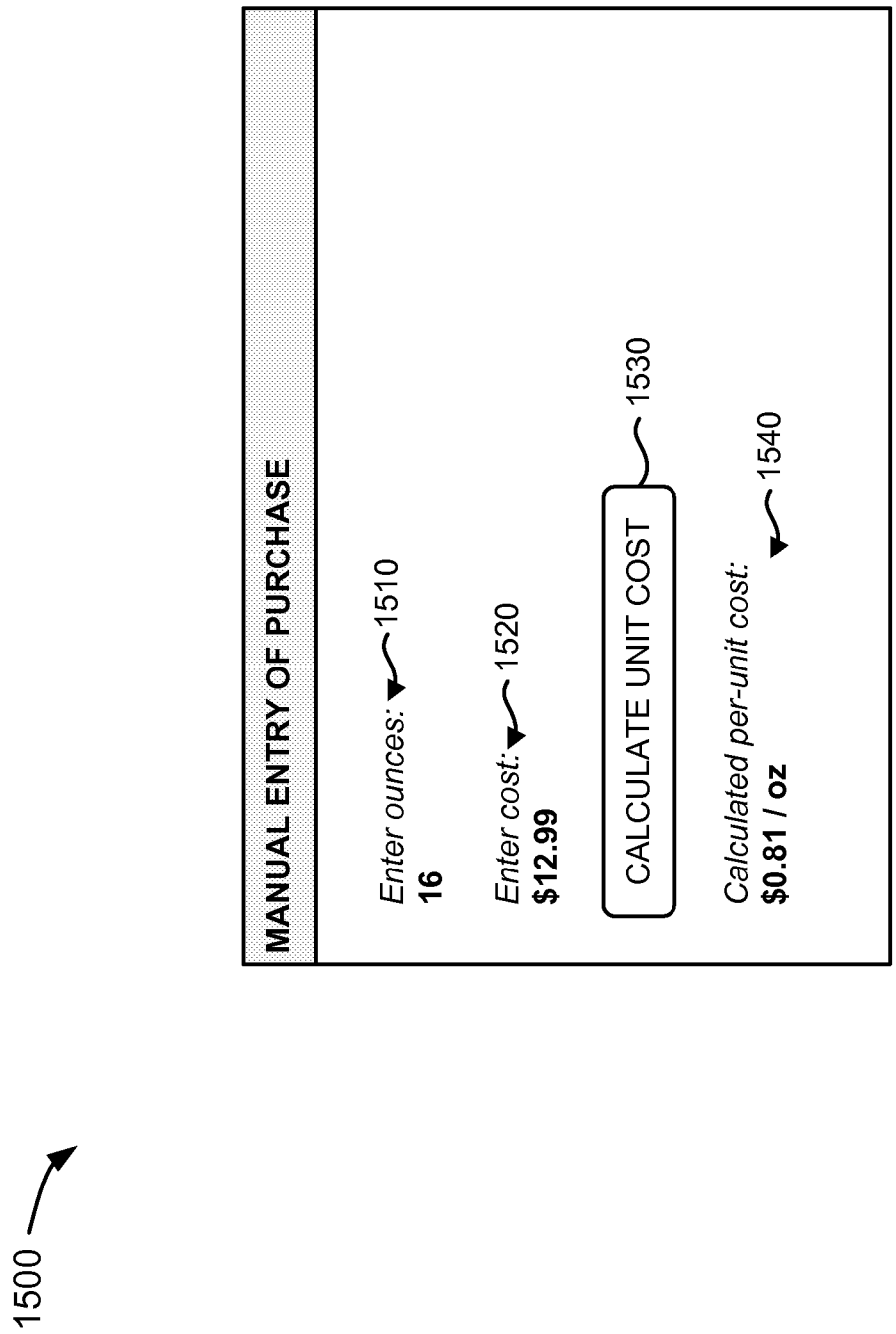

If the user selects one of unit selections 1420-1450 (e.g., unit selection 1420 for ounces) and/or provides new purchase information via new purchase input mechanism 1460, user device 110 may display an exemplary user interface 1500, as depicted in FIG. 15. As illustrated in FIG. 15, user interface 1500 may permit the user to manually input information associated with a new purchase. For example, user interface 1500 may include a unit input section 1510, a cost input section 1520, a calculate unit cost selection mechanism 1530, and/or a calculated per-unit cost section 1540.

Unit input section 1510 may instruct the user to input an amount of units purchased with the new purchase. For example, unit input section 1510 may instruct the user to input an amount of ounces (e.g., "Enter ounces"), and the user (e.g., via display 320, control buttons 330, and/or keypad 340) may input the amount (e.g., "16 ounces").

Cost input section 1520 may instruct the user to input a cost associated with the new purchase. For example, cost input section 1520 may instruct the user to input a total cost of the new purchase (e.g., "Enter cost"), and the user (e.g., via display 320, control buttons 330, and/or keypad 340) may input the total cost (e.g., "$12.99"). In one implementation, user device 110 may compare the new purchase information (e.g., description, units, cost, etc.) to a similar item contained in the purchase database, and may display the comparison. For example, if it is assumed that the new purchase is milk that costs $4.00, user device 110 may compare and display information associated with the newly purchased milk, as well as previously purchased milk.

Calculate unit cost selection mechanism 1530 may include a mechanism (e.g., a button, an icon, a link, etc.) that, if selected (e.g., with a selection mechanism), may enable user device 110 to calculate the per-unit cost provided in calculate per-unit cost section 1540 (e.g., "$0.81/oz") for the new purchase.

Returning to FIG. 9, if lowest cost for product option 940 is selected by the user, user device 110 may display information associated with lowest costs for one or more products recorded by user device 110. For example, if the lowest cost of gas recorded by user device 110 was "$2.77 per gallon" and the lowest cost of bread recorded by user device 110 was "$3.00 per loaf," user device 110 may retrieve (e.g., from the purchase database) and display this information to the user if lowest cost for product option 940 is selected.

Although FIGS. 9-15 show exemplary elements of user interfaces 900-1500, in other implementations, user interfaces 900-1500 may contain fewer, different, or additional elements than depicted in FIGS. 9-15.

FIGS. 16-19 depict flow charts of an exemplary process 1600 for inputting, managing, and tracking purchases (e.g., purchase trends) using user device 110 according to implementations described herein. In one implementation, process 1600 may be performed by user device 110. In another implementation, some or all of process 1600 may be performed by another device or group of devices, including or excluding user device 110. For example, some or all of process 1600 may be performed by purchase server 120.

Figure 16:
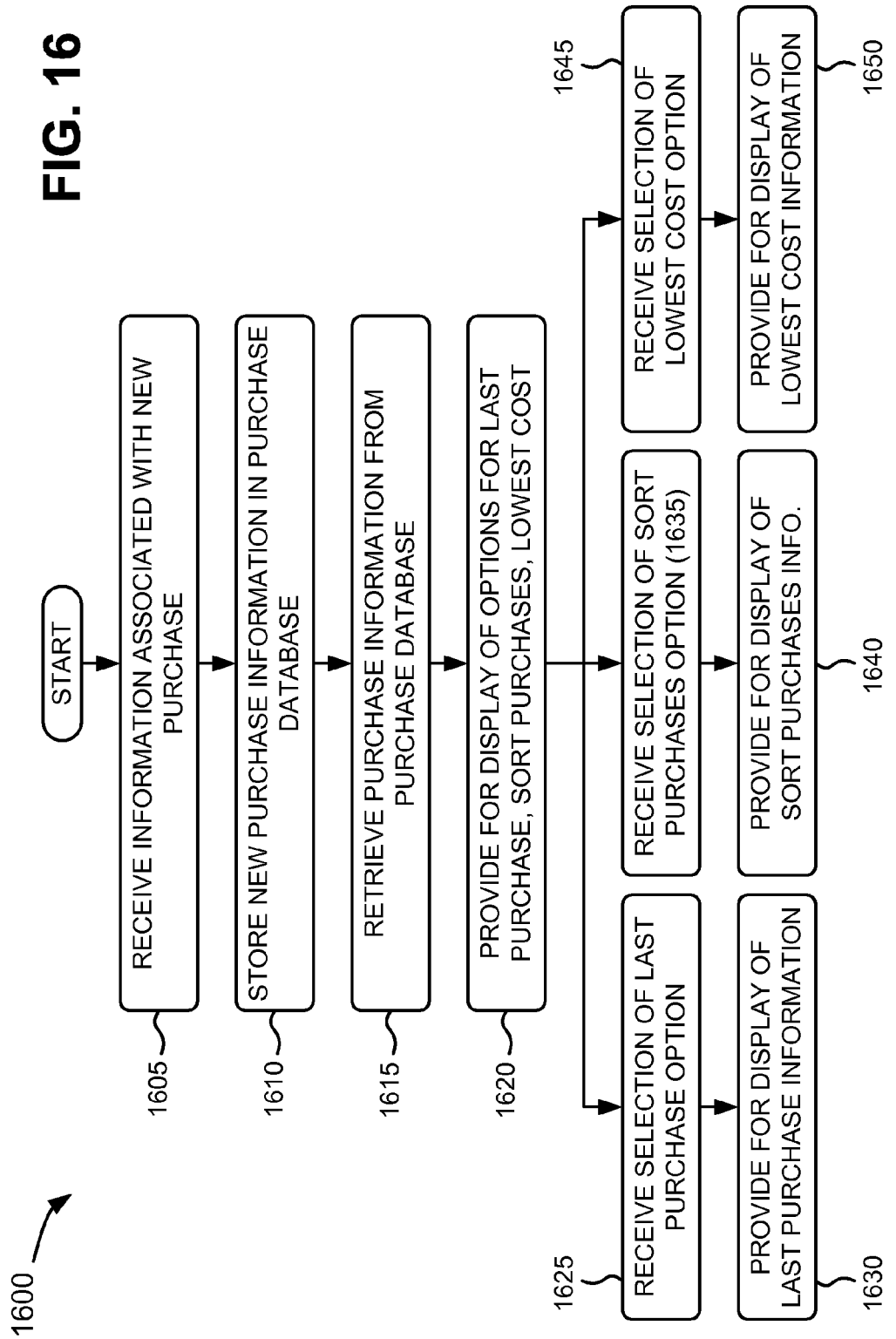

As illustrated in FIG. 16, process 1600 may begin with receipt of information associated with a new purchase (block 1605), and storage of the new purchase information in a purchase database (block 1610). For example, in implementations described above in connection with FIG. 1, user device 110 may receive purchase information 140 associated with purchase 150 (e.g., a purchase by a user of user device 110). In one example, user device 110 may receive purchase information 140 by capturing a barcode associated with purchase 150. In another example, a user of user device 110 may manually input purchase information 140, such as a description of purchase 150, a date of purchase 150, a store where purchase 150 was made, a cost of purchase 150, a unit cost of purchase 150, etc. Purchase information 140 may be stored in a purchase database provided in user device 110, and/or may be forwarded by user device 110 (e.g., via network 130) to a purchase database provided in purchase server 120.

As further shown in FIG. 16, purchase information relating to the new purchase may be retrieved from the purchase database (block 1615), and a last purchase option, a sort purchases options, and a lowest cost option may be provided for display (block 1620). For example, in implementations described above in connection with FIG. 1, the user of user device 110 may access purchase information (e.g., purchase information 140, historical purchase information, etc.) from the purchase database, and user device 110 may display selectable options associated with the purchase database. In one example, user device 110 may display a last purchase option, a sort purchases option, a lowest cost option, etc.

Returning to FIG. 16, if a user selects the last purchase option, selection of the last purchase option may be received (block 1625), and last purchase information may be provided for display (block 1630). For example, in implementations described above in connection with FIG. 9, if the user selects last purchase option 910, user device 110 may display information associated with a last purchase recorded by user device 110. In one example, if the last recorded purchase by the user was $20.00 worth of gasoline at Gas station 1 on Nov. 30, 2007, user device 110 may retrieve (e.g., from the purchase database) and display this information to the user if last purchase option 910 is selected.

As further shown in FIG. 16, if a user selects the sort purchases option, selection of the sort purchases option may be received (block 1635), and sort purchases information may be provided for display (block 1640). For example, in implementations described above in connection with FIGS. 9 and 10, if the user selects sort purchases option 920, user device 110 may display user interface 1000, which may include instruction section 1010, product selection 1020, price selection 1030, store selection 1040, and/or purchase date selection 1050. Instruction section 1010 may instruct the user to select a means (e.g., selections 1020-1050) by which to sort purchases (e.g., "Select Means To Sort Purchase History By"). Selections 1020-1050 may be selected by a user of user device 110 (e.g., via display 320, control buttons 330, and/or keypad 340), and may permit the user to sort purchases based on product (e.g., product selection 1020), price (e.g., price selection 1030), store (e.g., store selection 1040), and/or purchase date (e.g., purchase date selection 1050).

Returning to FIG. 16, if a user selects the lowest cost option, selection of the lowest cost option may be received (block 1645), and lowest cost information may be provided for display (block 1650). For example, in implementations described above in connection with FIG. 9, if lowest cost for product option 940 is selected by the user, user device 110 may display information associated lowest costs for one or more products recorded by user device 110. For example, if the lowest cost of gas recorded by user device 110 was "$2.77 per gallon" and the lowest cost of bread recorded by user device 110 was "$3.00 per loaf," user device 110 may retrieve (e.g., from the purchase database) and display this information to the user if lowest cost for product option 940 is selected.

Figure 17:
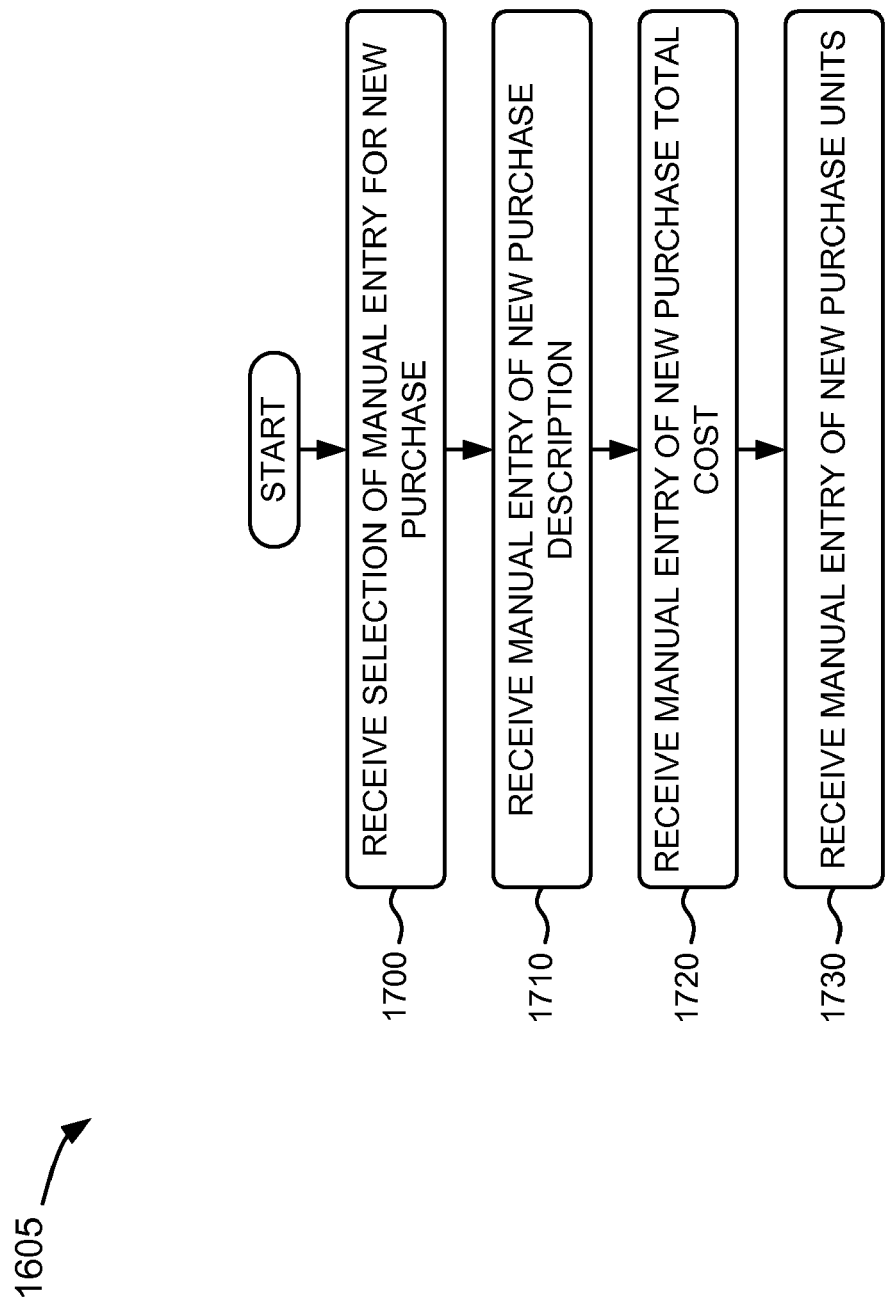

Process block 1605 may include the process blocks illustrated in FIG. 17. As shown in FIG. 17, process block 1605 may include receiving selection of manual entry for the new purchase (block 1700), receiving manual entry of a new purchase description (block 1710), receiving manual entry of a new purchase total cost (block 1720), and receiving manual entry of new purchase units (block 1730). For example, in implementations described above in connection with FIGS. 9, 14, and 15, if the user selects manually enter purchase option 930, user device 110 may display exemplary user interface 1400, which may include instruction section 1410, unit selections 1420-1450, and new purchase input mechanism 1460. Instruction section 1410 may instruct the user to select units associated with a new purchase. Unit selections 1420-1450 may include a variety of units of measure associated with purchases, and may be selected by a user of user device 110. New purchase input mechanism 1460 may include an input field (e.g., for typing descriptive information associated with a new purchase). If the user selects one of unit selections 1420-1450 and/or provides new purchase information via new purchase input mechanism 1460, user device 110 may display exemplary user interface 1500, which may permit the user to manually input information associated with a new purchase.

Alternatively and/or additionally, process block 1605 may include the process blocks illustrated in FIG. 18. As shown in FIG. 18, process block 1605 may include capturing an image of a barcode associated with the new purchase using a user device camera (block 1800), and determining the new purchase information based on the barcode capture (block 1810). For example, in implementations described above in connection with FIG. 4, user device 110 may include a barcode reader application that interacts with camera 360 of user device 110 to capture images of barcodes (e.g., barcode 410). The barcode reader application may analyze an image of a barcode and may interpret the barcode image into an actual value (e.g., a UPC value). User device 110 may also use an OCR application to check digits provided in a captured barcode image and to verify the accuracy of the interpreted barcode image. User device 110 (e.g., using the barcode reader application and/or the OCR application) may extract information associated with barcode 410, such as purchase information 140.

Process block 1640 may include the process blocks illustrated in FIG. 19. As shown in FIG. 19, process block 1640 may include providing for display of sort purchases based on a product type (block 1900), providing for display of sort purchases based on a purchase price (block 1910), providing for display of sort purchases based on stores associated with the purchases (block 1920), and providing for display of sort purchases based on a purchase date (block 1930). For example, in implementations described above in connection with FIG. 10, user interface 1000 may include instruction section 1010, product selection 1020, price selection 1030, store selection 1040, and/or purchase date selection 1050. Instruction section 1010 may instruct the user to select a means (e.g., selections 1020-1050) by which to sort purchases. Selections 1020-1050 may be selected by a user of user device 110 (e.g., via display 320, control buttons 330, and/or keypad 340), and may permit the user to sort purchases based on product (e.g., product selection 1020), price (e.g., price selection 1030), store (e.g., store selection 1040), and/or purchase date (e.g., purchase date selection 1050).

Implementations described herein may input, manage, and track purchases using a user device. The purchases may be recorded in a purchase database that may include user-definable information associated with the purchases. The user or customer may sort the user-definable information using a display of the user device, and may input total units and a cost associated with a purchase to calculate a per-unit price of the purchase. The customer may use historical purchase information to, for example, comparison shop between sales, stores, and/or franchises on a per visit basis.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 16-19, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A mobile communications device-implemented method, comprising:
   receiving, at a mobile communications device, a query from a remote device for determining whether the mobile communications device needs updated purchase information;
   receiving, at the mobile communications device, the updated purchase information in response to determining that the mobile communications device needs the updated purchase information;
   storing the received updated purchase information in a purchase database in the mobile communications device;
   retrieving information associated with purchases from the purchase database after storing the updated purchase information;
   providing for display of a last purchase option, a sort purchases option, and a lowest cost option based on the retrieved information associated with purchases;
   receiving selection of one of the last purchase option, the sort purchases option, or the lowest cost option;
   providing for display of last purchase information when the last purchase option is selected;
   providing for display of sort purchases information when the sort purchases option is selected;
   providing for display of lowest cost information when the lowest cost option is selected; and
   placing new purchase information associated with a new purchase in the purchase database after storing the updated purchase information,
   wherein the mobile communications device comprises a camera, and
   wherein placing the new purchase information associated with a new purchase comprises:
   capturing an image of a barcode associated with the new purchase using the camera;
   determining the new purchase information based on the captured image of the barcode; and
   storing the determined new purchase information in the purchase database.

2. The mobile communications device-implemented method of claim 1, where providing for display of last purchase information comprises:
   providing for display of a last purchase recorded in the purchase database by the mobile communications device.

3. The mobile communications device-implemented method of claim 1, where providing for display of sort purchases information comprises providing for display of purchases sorted based on stores associated with the purchases.

4. The mobile communications device-implemented method of claim 1, where providing for display of lowest cost information comprises:
   providing for display of lowest costs for one or more products recorded in the purchase database by the mobile communications device.

5. The mobile communications device-implemented method of claim 1, further comprising where receiving information associated with a new purchase further comprises:
 receiving selection of an option to manually input the new purchase information;
 receiving manual input of a description for the new purchase;
 receiving manual input of a total cost of the new purchase; and
 receiving manual input of units associated with the new purchase.

6. A computer-readable memory device provided in a mobile communications device comprising computer-executable instructions, the computer executable instructions for causing, when executed by the mobile communications device, the mobile communications device to perform a method comprising:
 receiving, at a mobile communications device, a query from a remote device for determining whether the mobile communications device needs updated purchase information;
 receiving, at the mobile communications device, the updated purchase information in response to determining that the mobile communications device needs the updated purchase information;
 storing the received updated purchase information in a purchase database in the mobile communications device;
 retrieving information associated with purchases from the purchase database after storing the updated purchase information;
 providing for display of a last purchase option, a sort purchases option, and a lowest cost option based on the retrieved information associated with purchases;
 receiving selection of one of the last purchase option, the sort purchases option, or the lowest cost option;
 providing for display of last purchase information when the last purchase option is selected;
 providing for display of sort purchases information when the sort purchases option is selected;
 providing for display of lowest cost information when the lowest cost option is selected; and
 placing new purchase information associated with a new purchase in the purchase database after storing the updated purchase information,
 wherein the mobile communications device comprises a camera, and
wherein placing the new purchase information associated with a new purchase comprises:
 capturing an image of a barcode associated with the new purchase using the camera;
 determining the new purchase information based on the captured image of the barcode; and
 storing the determined new purchase information in the purchase database.

7. The computer-readable memory device of claim 6, where the mobile communications device comprises one of a radiotelephone, a personal communications system (PCS) terminal, a personal digital assistant (PDA), a global positioning system (GPS) device, or a cellular telephone.

8. The computer-readable memory device of claim 6, wherein placing information associated with a new purchase further comprises:
 receiving selection of an option to manually input the new purchase information;
 receiving manual input of a description for the new purchase;
 receiving manual input of a total cost of the new purchase; and
 receiving manual input of units associated with the new purchase.

9. The computer-readable memory device of claim 6, where the barcode comprises at least one of a Universal Product Code (UPC) barcode, a European Article Number (EAN) barcode, a code 39 barcode, a code 128 barcode, an interleaved 2 of 5 symbology, a postnet barcode, or a PDF417 barcode.

10. The computer-readable memory device of claim 6, where the barcode encodes the new purchase information.

11. The computer-readable memory device of claim 6, where determining the new purchase information comprises:
 determining the new purchase information with a barcode reader application based on the captured image of the barcode; and
 determining the new purchase information with an optical character recognition (OCR) application based on the captured image of the barcode.

12. The computer-readable memory device of claim 8, where the purchase database comprises at least one of: descriptions of purchases; dates of purchases; stores where purchases were made; costs of purchases; amounts of purchases; or unit costs of purchases.

13. The computer-readable memory device of claim 6, wherein the method further comprises:
 providing for display of a last purchase recorded in the purchase database by the mobile communications device when the last purchase option is selected.

14. The computer-readable memory device of claim 6, wherein providing for display of the sort purchases information when the sort purchases option is selected comprises at least one of:
 providing for display of purchases sorted based on product type;
 providing for display of purchases sorted based on purchase price;
 providing for display of purchases sorted based on stores associated with the purchases; or
 providing for display of purchases sorted based on purchase date.

15. The computer-readable memory device of claim 6, wherein the method further comprises:
 providing for display of lowest costs for one or more products recorded in the purchase database by the mobile communications device when the lowest cost option is selected.

16. The computer-readable memory device of claim 6, where the purchase database is provided in a purchase server and is accessed by sending the new purchase information from the mobile communications device to the remote device.

17. The computer-readable memory device of claim 6, wherein the purchases comprise services.

* * * * *